United States Patent

[11] 3,630,299

| [72] | Inventor | Raoul H. Albagli |
| | | Jamaica, N.Y. |
| [21] | Appl. No. | 97,673 |
| [22] | Filed | Dec. 14, 1970 |
| [45] | Patented | Dec. 28, 1971 |
| [73] | Assignee | Scale Electronics Development Inc. |
| | | Wantagh, N.Y. |

[54] PLATFORM WEIGHING SCALE AND LOADING ADAPTER THEREFOR
9 Claims, 6 Drawing Figs.

[52] U.S. Cl. .................................................. 177/145, 177/253
[51] Int. Cl. ...................................... G01g 21/22
[50] Field of Search .......................................... 177/145, 253, 126; 14/71

[56] References Cited
UNITED STATES PATENTS

| 2,823,911 | 2/1958 | Murphy ........................ | 177/126 UX |
| 2,860,868 | 11/1958 | Wells ............................ | 177/145 X |
| 3,006,008 | 10/1961 | Loomis et al. ................ | 14/71 |

Primary Examiner—Richard B. Wilkinson
Assistant Examiner—George H. Miller, Jr.
Attorney—Bauer & Amer ABSTRACT: A portable adapter for weighing scale having a platform wherein the portable adapter has a top surface positioning upon the platform to form a part of the scale and for movement therewith. The adapter structure also includes tracks and ramps such that when the same is positioned upon a weighing scale, the scale is converted to enable a wheelchair and patient to be moved upon the scale for simultaneous weighing.

PATENTED DEC 28 1971 3,630,299
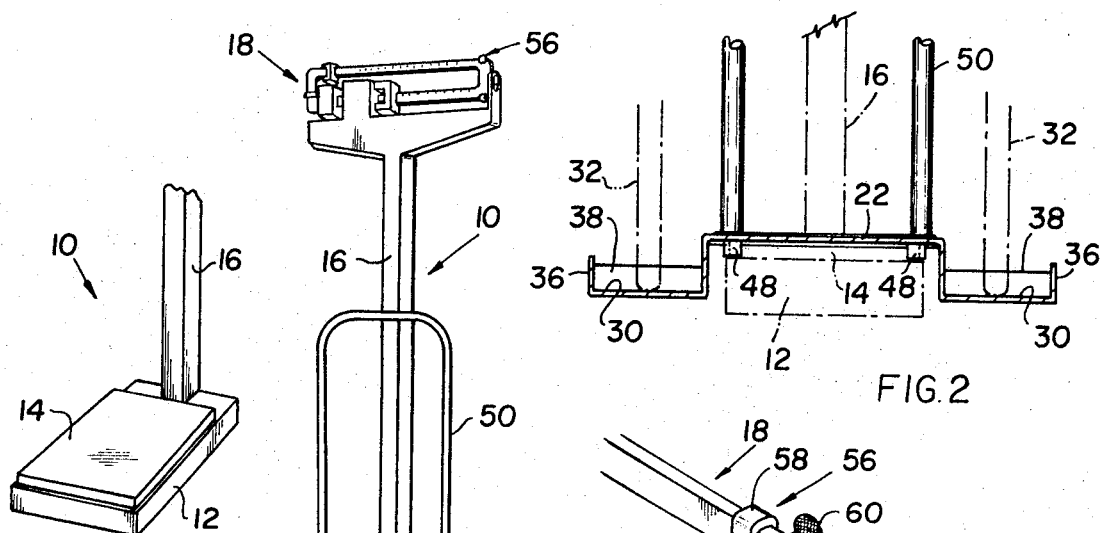
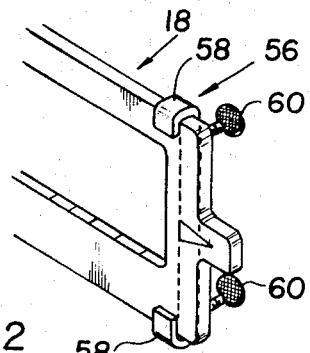
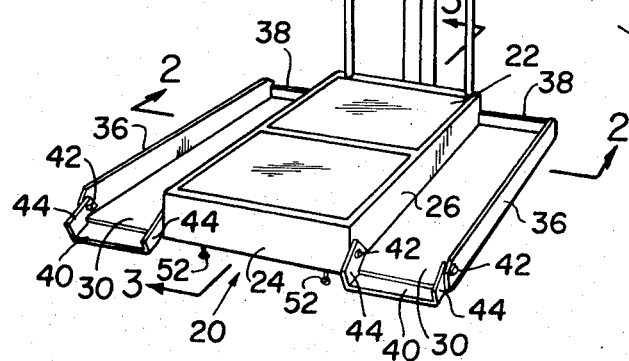
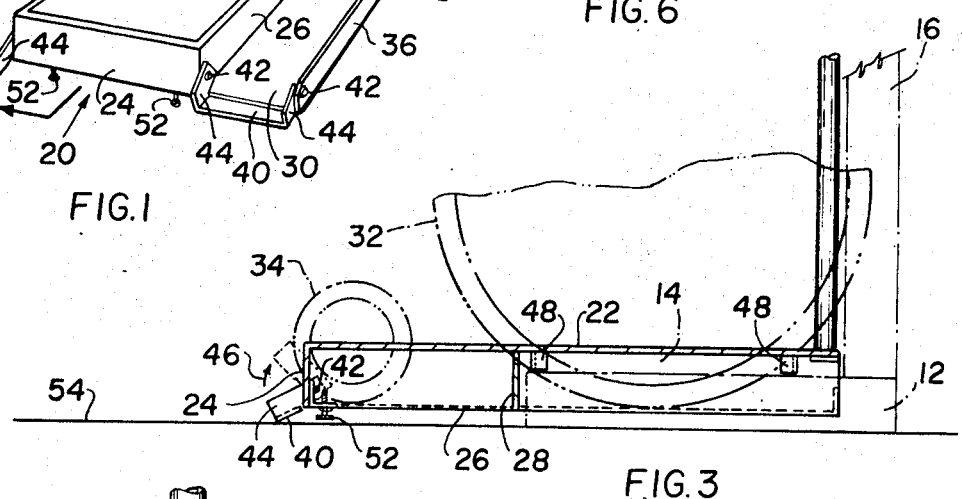
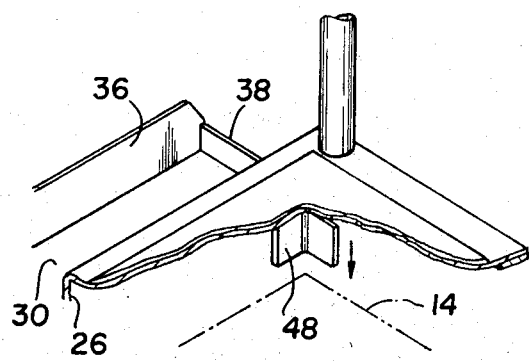
INVENTOR.
RAOUL H. ALBAGLI
BY Bauer & Ames
ATTORNEY

PLATFORM WEIGHING SCALE AND LOADING ADAPTER THEREFOR

The present invention relates to weighing scales. More particularly, it relates to the provision of an adapter that is portable to enable its application to weighing scales to quickly and easily convert a scale to enable its use by persons confined to wheelchairs.

In hospitals, medical clinics, nursing homes, and similar institutions, when it was necessary to weigh an individual or patient confined to a wheelchair, the patient has been required to leave the safety and security of the wheelchair and stand upon the scale during the weighing procedure.

Oftentimes, this required the assistance of at least two attendants to lift the patient from the wheelchair and support him on the scale platform while another attendant manipulated the balance of the scale. It is apparent that such manipulations and movements are often harmful to the patient, both physically and mentally. The time and expense of use of two or more attendants necessary in such weighing procedure and the possibility that the patient still may not be properly weighed are problems solved by the present invention.

Accordingly, an object of the invention is to provide an adapter for use with the platform of a presently existing scale to quickly, easily, and inexpensively convert the same for wheelchair use by the patient with the aid of one attendant.

Another object of the invention is to provide such an adapter that is portable so that it may be conveniently applied to and removed from the scale for application to another scale.

The above description, as well as further objects, features and advantages of the present invention, will be more fully appreciated by reference to the following detailed description of a presently preferred, but nonetheless illustrative, embodiment in accordance with the present invention, when taken in conjunction with the accompanying drawings, wherein:

FIG. 1 is a perspective view of a scale with the adapter applied thereto constructed in accordance with the teaching of the invention;

FIG. 2 is a cross section of FIG. 1 taken along lines 2—2;

FIG. 3 is a cross section of FIG. 1 taken along lines 3—3;

FIG. 4 illustrates the platform portion of a balance beam-type scale;

FIG. 5 is an enlarged perspective view of a corner portion as shown encircled in FIG. 1; and FIG. 6 is an enlarged view of a portion of the balance beam of FIG. 1.

Referring now to the drawings, the scale shown in FIG. 1 and in partial view in FIG. 4 is generally identified by the numeral 10. The weighing scale 10 is generally of the balance beam type which comprises a base 12 adapted to be supported in a level position on any convenient surface. Mounted for movement above the base 12 is a supporting or standing platform 14 on which the person or object to be weighed is placed. A vertical post or upright 16 is connected to the base 12 and supports the actuating mechanisms (not shown) for operating the balance beam scale structure that may be of any conventional design and which is illustrated in FIG. 1 generally by the numeral 18.

Thus, what has been described is well known and conventional in the art and forms no part of the present invention other than as background for the subsequent description of the inventive subject matter. However, it is to be clearly understood that although a balance beam-type weighing scale has been described for use by and in connection with the present invention, the same should constitute no limitation upon the scope of the present disclosure, it being understood by those who are skilled in he art that the present invention is equally adaptable to other weighing scale structures.

Referring now to the drawings, the adapter structure for a weighing scale is generally identified by the numeral 20. The weighing scale adapter 20 comprises a longitudinally elongated top surface 22 that has a generally planar upper surface adapted to be disposed over and astride the weighing platform 14 in a level or substantially horizontal plane. The top surface 22 terminates at its forward or entry end in a downwardly turned smoothly surfaced end 24. The forward or leading end 24 is integrally connected with downward turn sides 26 which extend along the full length of the top surface 22. The tow sides 26 and the end 24 when secured together in the relationship as shown in the drawing form an extremely rigid construction. The top surface 22 is further rigidified by a crossbar 28 that extends laterally on the underside of the top surface from one side 26 to the opposite side as shown in FIG. 3.

Depending downwardly from the opposite sides of the top surface 22 and formed integrally with the downwardly depending sides 26 and extending substantially for the full length of the top surface 22 is a pair of longitudinally extending tracks 30. Each track 30, depending from the opposite sides of the top surface 22, has a horizontal riding surface that is disposed along a substantially horizontal plane that is lower than the planar surface presented by the top surface 22. The tracks 30 are of sufficient width to enable a wheelchair or the like to be rolled onto and off of the same.

In order to understand this more clearly, the wheels of a wheelchair have been shown and illustrated in dot-dash lines in FIGS. 2 and 3. The larger wheels of the wheelchair are identified by the numeral 32 while the smaller wheels are identified by the numeral 34. The width of each track 30 is sufficient to enable the accommodation of the wheels thereon even though the wheelchair may not be driven upon the same in exactly a straight line or perhaps centered on the adapter structure 20. The reason for this will be clearly understood by those who are skilled in the art. Patients who use wheelchairs are usually not sufficiently strong to be able to roll or drive a wheelchair up onto and down from the tracks 30 in a straight line or necessarily in the center of the tracks. Hence, it is important and helpful if the tracks 30 are sufficiently wide to provide easy access thereto and egress therefrom without requiring extraneous or tiresome manipulation of the wheelchair by the patient or attendant.

Each of the downwardly depending tracks 30 is projected along the lateral outer sides thereof by upstanding walls 36. The walls 36 assure that the wheels of the wheelchair are properly guided along the tracks and that the same cannot be driven laterally off the sides of the tracks and thereby unduly tilt the wheelchair so as to cause the patient to fall out of the same. Each track terminates in a substantially upwardly projecting stop 38. The stops 38 define the far or rear end of each track and thus assure that the wheelchair will not be driven too far along the tracks so as to cause the patient to injure himself.

The forward end of each track is provided with an ingress or egress entranceway or ramp 40. Each ramp 40 is pivotally mounted to its respective track 30 at the opposite lengthwise defining walls 26 and 36 thereof by pivot pins 42. The ramps 40 are made sufficiently long in length so as to pivot with their upper riding surfaces beneath the leading edge of each track 30. Like the tracks 30, the ramps 40 each have upstanding sides 44 that serve as entrance guides to assure the proper alignment of the wheels of the wheelchair with their respective tracks 30. This ensures that when the wheelchair is aligned with the ramps 40 between their upstanding protecting guide sides 44, the wheelchair will automatically align with their respective tracks 30. It is noted that the upstanding sides 44 are positioned inward of the width of the tracks 30 and are pivotally mounted on the inner facing sides of the walls 26 and 36. This narrow width of each of the ramps 40 thus provides for proper alignment of the wheels of the wheelchair with their respective tracks 30.

The pivotal mounting of each of the ramps 40 to the respective tracks enables the same to be lowered to a position inclined downward with respect to its track so as to provide a smooth and effortless ingress of the wheels upwardly along the ramps and onto their respective tracks. The ramps may then be pivoted upward at their pivots 42 to a substantially inclined position as shown by the arrow 46 in FIG. 3 so as to prevent the wheels 32 and 34 of the wheelchair from accidentally rolling off the tracks. Thus, the ramps 40 function both as ingress and egress ramps to and from the tracks and also as stops much in the same manner as the stops 38 function to limit the movement of the wheelchair along the tracks.

Mounted on the underside of the top surface 22 is a plurality of cleats, more clearly demonstrated in FIGS. 2, 3 and 5. The cleats 48 shown in the present illustration are right-angle shaped elements that depend downwardly from the underside of the top surface 22. They conform in configuration to that of the platform 14 beneath the top surface so as to properly position the top surface 22 and the structure of the weighing scale adapter 20 precisely on the platform 14 to prevent tilting or movement relative thereto in a horizontal or lateral direction. The cleats do, however, because of their construction, enable the vertical displacement of the adapter structure 20 onto and off the platform 14 when it is desired to apply the same to a standard weighing scale of the type 10 illustrated in FIG. 4 or to remove the same therefrom and carry the same to another scale where such adapter structure 20 may be required for use. Thus, if the platform 14 of the weighing scale were circular in configuration, the cleats 48 would be similarly conforming, but would permit the function of the portable adapter weighing scale structure to be applied to and removed from the same with the same convenience as is apparent with respect to the present disclosure.

Mounted on the adapter structure 20 and more particularly at the top of the top surface 22 thereof is a substantially inverted U-shaped handrail 50. The legs of the handrail 50 are suitably mounted in any convenient manner to the rear end of the top surface 22 in a position adjacent to the standard or post 16 of the weighing scale. The horizontally disposed portion of the U-shaped handrail 50 provides a convenient grip for anyone who may be standing on or using the adapter structure 20. Because of its position at the rear end of the top surface 22, the handrail 50 also functions as a stop for any conveyance or wheelchair that may be rolled thereon.

In operation, the weighing scale adapter structure 20 can be utilized with any conveniently shaped weighing scale and may be applied to the same in the manner previously described; that is to say, that by aligning the cleats 48 thereof with the platform 14 of the scale, the adapter structure 20 may be vertically positioned thereon such that the top surface 22 is astride in horizontal relationship with the platform 14. The various structural details previously described retain the top surface 22 as rigid as does the platform that supports the same.

Although the cleats 48, conforming to the platform 14, function adequately and sufficiently to prevent relative horizontal movement between the adapter structure 20 and the platform 14 of the weighing scale, it is helpful to apply to the bottom of the adapter structure a set of adjustable legs 52 that may be provided at the forward end of the underside of such structure 20. The legs 52 may be adjusted in height relative to the ground surface 54 (FIG. 3) on which the weighing scale structure 10 is adapted to be supported. The height of the legs 52 spaced from the ground surface 54 may be such as to permit the platform 14 to lower to its maximum depth in response to the weight of an article placed on the top surface 22 astride the same. Thus, should there be a possibility or tendency of the adapter structure 20 to tilt relative to the platform 14 while a wheelchair is being driven up onto or down from the same, the relative spacing between the adjustable legs 52 and the ground surface 54 will limit the degree of tilt.

When the adapter structure 20 is properly applied to a weighing scale such as that shown in FIG. 4, it is apparent that the balancing of the balance beam structure of such scale must be adjusted. However, instead of adjusting the poises normally present on the balance beam of the scale, the present invention includes the application and utilization of a counterbalance which is applied to the balance beam in the manner shown in FIG. 6. The counterbalance structure, generally identified by the numeral 56, comprises a substantially channel-shaped element having oppositely disposed facing U-shaped ends 58 that are adapted to be positioned about and slidable along the horizontally disposed portions of the balance beam structure 18. The legs 58 and the counterbalance 56 may be conveniently secured to and removed from the balance beam structure 18 through the application of thumb screws 60.

When the counterbalance 56 is applied to the balance beam structure 18, the same counterbalances the total weight of the weighing scale adapter structure 20 when the same is applied to the scale 10. This includes the weight of the top surface, the tracks and the ramp means and all remaining attendant details of such adapter structure. Hence, when the adapter structure 20 is removed from the scale 10 in the manner previously described and placed upon another scale for use, the counterbalance weight 56 may be removed from the counterbalance structure 18 by loosening the thumb screws 60, thereby enabling the counterbalance to be placed on the next scale.

It is apparent that in use, the present invention is novel. The present invention permits a patient to wheel himself directly up onto a standard scale or be wheeled on with the aid of an attendant when the adapter structure 20 is positioned astride such scale. The patient may then be weighed by an attendant while remaining in seated position in the wheelchair. After the weighing procedure is completed, the patient then may roll himself off of the scale without the need of ever having raised himself up from or removed his body from the wheelchair. It is apparent that the weight of the patient may be determined by weighing the wheelchair structure when the same is empty and deducting the weight of the wheelchair structure from that of the total weight shown on the balance beam scale after the patient and the wheelchair had been weighed together on the same or, if desired, a counterbalance may be placed on the beam to tare off the weight of the chair. The handrail 50 provides a convenient means for gripping the scale while the ambulatory patient walks up onto and off of the scale and thereby enables him to support himself during the weighing operation. The stop means 38 at the end of each ramp structure assures that the wheelchair will not ride too far along the adapter structure so as to injure the patient.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In a weighing scale having a platform and a balance beam or other means of weight indication
   a top surface on said platform extending lengthwise beyond the length of said platform in a direction away from said balance beam,
   tracks on said top surface, said tracks bracketing opposite sides of said platform and extending in the direction of the length thereof to guide the wheels of a vehicle from the entrance thereof for movement toward said balance beam,
   each of said tracks depending from said top surface a distance spaced from the surface on which the scale is supported, and
   means at the entrance of each track to define a ramp inclined from the supporting surface to its respective track.

2. In a weighing scale as in claim 1,
   stop means at one end of each of said tracks opposite said ramp means to stop the movement of a vehicle along said tracks, and
   said ramp means being pivotable on and relative to their respective tracks from an inclined position to afford entry to and egress from said tracks and a substantially upward position to stop egress from said tracks.

3. In a weighing scale as in claim 2, means on said top surface conforming to preselected portions of the configuration of said platform to prevent relative horizontal movement between said top surface and platform.

4. In a weighing scale as in claim 1,
a counterbalance on said balance beam including means to releasably secure the same to said balance beam to counterbalance the weight of said top surface, tracks and ramp means on said platform.

5. In a weighing scale as in claim 4,
and a handrail on and extending upward for a selected height of said scale adjacent said balance beam and between said top surface and balance beam.

6. A removable adapter for a weighing scale comprising
a substantially planar top surface of a size and shape for placement astride the platform of a weighing scale,
a pair of tracks one each depending from said top surface along opposite sides thereof and each track having a horizontal riding surface disposed along a substantially horizontal plane lower than said top surface,
a ramp pivotally mounted on each of said tracks for movement to a position inclined downward with respect to its track and to a position inclined upward with respect to its track, and
means on said top surface to position the same on a platform of a weighing scale to prevent relative horizontal movement therebetween and permit relative vertical movement therebetween.

7. A removable adapter as in claim 6,
a handrail connected to said top surface and extending upward therefrom to a selected height.

8. A removable adapter as in claim 7,
said handrail being an inverted substantially U-shape defining an upstanding abutment at one end of said top surface opposite that of said ramps.

9. A removable adapter as in claim 8,
stop means at the ends of each of said tracks opposite said ramps to terminate the extent of each said ramp.

* * * * *